US010284999B2

(12) United States Patent
Kumar et al.

(10) Patent No.: US 10,284,999 B2
(45) Date of Patent: May 7, 2019

(54) MOBILE DEVICE POSITION DETERMINATION USING COMPATIBLE DEDICATED-FREQUENCY NODES AND NON-DEDICATED-FREQUENCY NODES

(71) Applicant: QUALCOMM Incorporated, San Diego, CA (US)

(72) Inventors: Akash Kumar, Hyderabad (IN); Amit Jain, San Diego, CA (US); Sai Pradeep Venkatraman, Santa Clara, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/591,994

(22) Filed: May 10, 2017

(65) Prior Publication Data

US 2018/0332430 A1 Nov. 15, 2018

(51) Int. Cl.
*H04W 4/02* (2018.01)
*H04B 17/318* (2015.01)
*G01S 5/02* (2010.01)

(52) U.S. Cl.
CPC ............. *H04W 4/02* (2013.01); *G01S 5/0263* (2013.01); *H04B 17/318* (2015.01)

(58) Field of Classification Search
CPC .................. H04W 4/02; H04B 17/318
(Continued)

(56) References Cited

U.S. PATENT DOCUMENTS

2007/0183355 A1* 8/2007 Kuchibhotla ..... H04W 52/0238
370/318
2013/0143502 A1 6/2013 Kazmi et al.
(Continued)

FOREIGN PATENT DOCUMENTS

WO 2007076232 A2 7/2007
WO 2015113722 A1 8/2015
(Continued)

OTHER PUBLICATIONS

McKibben B., et al., "LTE-Unlicensed: Augmenting Mobile Data Capacity, But Coexistence Needs Consideration", Advancing Technology's Agenda, 2014, pp. 1-15.
(Continued)

*Primary Examiner* — Inder P Mehra
(74) *Attorney, Agent, or Firm* — Thien T. Nguyen

(57) ABSTRACT

A mobile device can send and receive signals in a dedicated frequency band and receive signals in a separate frequency band separate from the dedicated frequency band. The mobile device can send one or more frequency band compatibility combinations each including first and second frequency bands, the first frequency band being in the separate frequency band and the second frequency band being in the dedicated frequency. The mobile device can listen, based on a received neighbor list, for a first signal that has a frequency in the first frequency band and for a second signal that has a frequency in the second frequency band. The mobile device can determine, based on the first signal, ranging information indicative of a range from the mobile device to a source of the first signal, e.g., to obtain improved accuracy ranging information.

30 Claims, 9 Drawing Sheets

(58) Field of Classification Search
USPC .................................. 455/226.2; 340/539.2
See application file for complete search history.

(56) References Cited

U.S. PATENT DOCUMENTS

| | | |
|---|---|---|
| 2015/0085797 A1 | 3/2015 | Ji et al. |
| 2016/0165604 A1* | 6/2016 | Khawer ............... H04W 16/14 |
| | | 455/452.1 |
| 2016/0183220 A1 | 6/2016 | Rashid et al. |
| 2016/0212629 A1 | 7/2016 | Wei et al. |
| 2016/0234708 A1 | 8/2016 | Yang et al. |
| 2016/0366618 A1 | 12/2016 | Quan et al. |
| 2016/0373170 A1* | 12/2016 | Szini ..................... H04B 7/0417 |
| 2017/0048041 A1* | 2/2017 | Yi ......................... H04L 5/0048 |
| 2017/0055193 A1* | 2/2017 | Mueck ................ H04W 84/042 |
| 2017/0188360 A1* | 6/2017 | Yu ......................... H04W 72/08 |
| 2017/0214536 A1* | 7/2017 | Wang ................. H04L 12/1407 |
| 2017/0317798 A1* | 11/2017 | Kim ..................... H04L 5/0012 |

FOREIGN PATENT DOCUMENTS

| | | |
|---|---|---|
| WO | 2015126298 A1 | 8/2015 |
| WO | 2016028405 A1 | 2/2016 |
| WO | 2016062666 A2 | 4/2016 |
| WO | 2018089152 | 5/2018 |

OTHER PUBLICATIONS

International Search Report and Written Opinion—PCT/US2018/026824—ISA/EPO—dated Jul. 2, 2018.

* cited by examiner

MOBILE DEVICE POSITION DETERMINATION USING COMPATIBLE DEDICATED-FREQUENCY NODES AND NON-DEDICATED-FREQUENCY NODES

BACKGROUND

Mobile communication devices are nearly ubiquitous today. As the devices are mobile, in addition to providing communication capabilities, a mobile device may also provide information regarding a location of the mobile device, e.g., to assist various applications to provide a variety of services to a user of the mobile device. The mobile device, such as a user equipment (UE), may be configured to perform positioning techniques to determine the location of the UE and/or to provide information to another device, e.g., a location server, that determines the location of the UE. For example, the UE or location server may use multilateration techniques to determine the location of the UE. To perform or assist with multilateration, the UE receives and analyzes positioning signals from multiple signal emitters, e.g., base stations, located at known locations. One example of a positioning technique that uses multilateration is Observed Time Difference Of Arrival (OTDOA), that uses differences in arrival times of positioning signals (e.g., positioning reference signal (PRS)) received by the UE from the multiple base stations to determine the location of the UE. A PRS may be referred to herein as a PRS signal and multiple PRSs may be referred to herein as PRS signals.

In order to perform OTDOA, or other positioning techniques, the location of the emitters and other information about the PRS signals are used. This information is provided to the UE in the form of assistance data. Assistance data may be sent from a serving base station to the UE from a location server associated with the network, or the assistance data may be received from a third party server. The assistance data may help the UE acquire the positioning signals, e.g., by providing search windows of time when the PRS signals should arrive at the UE.

Techniques other than multilateration with OTDOA may be used to determine a location of a mobile device. For example, trilateration using distances to several known locations, e.g., of base stations, may be used with ranges to the base stations determined by measuring signal strengths of received signals and determining their transmission strengths.

SUMMARY

An example of a mobile wireless communication device comprises: an antenna configured to send and receive signals in a dedicated frequency band that is dedicated to a communication protocol, and to receive signals in a separate frequency band that is separate from the dedicated frequency band; and a processor, communicatively coupled to the antenna, configured to: send, via the antenna to a location server, at least one frequency band compatibility combination wherein each of the at least one frequency band compatibility combination includes a first frequency band and a second frequency band indicative that the mobile wireless communication device can concurrently process signals in the first frequency band while processing signals in the second frequency band, the first frequency band being in the separate frequency band and the second frequency band being in the dedicated frequency band; receive, via the antenna, a neighbor list including a first frequency that is in the first frequency band and including a second frequency that is in the second frequency band; listen, based on the neighbor list, for a first signal that has the first frequency and that conforms to the communication protocol and for a second signal that has the second frequency and that conforms to the communication protocol; and determine ranging information based on the first signal, the ranging information being indicative of a range from the mobile wireless communication device to a first base station that is a source of the first signal.

An example of a mobile device ranging method comprises: sending, from the mobile device to a location server, at least one frequency band compatibility combination wherein each of the at least one frequency band compatibility combination includes a first frequency band and a second frequency band indicative that the mobile device can concurrently process signals in the first frequency band while processing signals in the second frequency band, the second frequency band being in a dedicated frequency band that is dedicated to a communication protocol, and the first frequency band being in a separate frequency band that is outside the dedicated frequency band; receiving, at the mobile device, a neighbor list including a first frequency that is in the first frequency band and including a second frequency that is in the second frequency band; listening, based on the neighbor list, for a first signal that has the first frequency and that conforms to the communication protocol and for a second signal that has the second frequency and that conforms to the communication protocol; and determining, by the mobile device, ranging information based on the first signal, the ranging information being indicative of a range from the mobile device to a source base station that is a source of the first signal.

An example of a non-transitory, processor-readable storage medium comprises processor-readable instructions configured to instruct one or more processors to: send, to a location server, at least one frequency band compatibility combination supported by a mobile device, each of the at least one frequency band compatibility combination including a first frequency band and a second frequency band indicative that the mobile device can concurrently process signals in the first frequency band while processing signals in the second frequency band, the second frequency band being in a dedicated frequency band that is dedicated to a communication protocol, and the first frequency band being in a separate frequency band that is outside the dedicated frequency band; receive a neighbor list including a first frequency that is in the first frequency band and including a second frequency that is in the second frequency band; listen, based on the neighbor list, for a first signal that has the first frequency and that conforms to the communication protocol and for a second signal that has the second frequency and that conforms to the communication protocol; and determine ranging information based on the first signal, the ranging information being indicative of a range from the mobile device to a source base station that is a source of the first signal.

An example of a mobile wireless communication device comprises: means for sending, to a location server, at least one frequency band compatibility combination supported by the mobile wireless communication device, each of the at least one frequency band compatibility combination including a first frequency band and a second frequency band indicative that the mobile wireless communication device can concurrently process signals in the first frequency band while processing signals in the second frequency band, the second frequency band being in a dedicated frequency band that is dedicated to a communication protocol, and the first frequency band being in a separate frequency band that is outside the dedicated frequency band; means for receiving a neighbor list including a first frequency that is in the first frequency band and including a second frequency that is in the second frequency band; means for listening, based on the neighbor list, for a first signal that has the first frequency and that conforms to the communication protocol and for a second signal that has the second frequency and that conforms to the communication protocol; and means for determining ranging information based on the signal from the first base station, the ranging information being indicative of a range from the mobile wireless communication device to the first base station.

DETAILED DESCRIPTION

Figure 1:
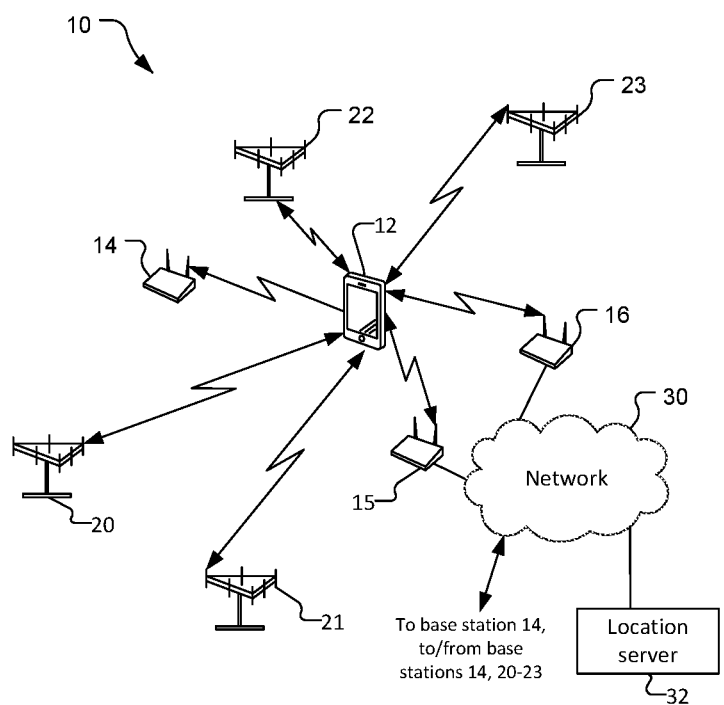
FIG. 1 is a simplified diagram of a wireless communications system.

Techniques are discussed herein for assisting with determining a position of a mobile wireless-communication device, or simply a mobile device. For example, a mobile device that may concurrently communicate using particular sets of frequencies reports these sets of compatible frequencies to a location server. Each of the sets of frequencies may include a frequency in a frequency band that is dedicated to a particular communication protocol and a frequency in a separate frequency band that is outside of the dedicated frequency band. For example, each of the sets may include a frequency band within a licensed Long-Term Evolution (LTE) band and a frequency band in an LTE-U (LTE Unlicensed) frequency band. The location server may use the reported sets of compatible frequencies to tailor assistance data provided to the mobile device. The assistance data may be tailored in such a way to prioritize base stations that use frequencies included in the sets of frequencies reported to the location server for use as primary cell base stations by the mobile device. Further, the mobile device may respond to a location request by searching for base stations that use the separate frequency band. The mobile device may perform such searching using one of multiple carrier aggregation signal processing chains. The mobile device may report an identity of any base station discovered in the searching to the location server. The location server may also or alternatively be able to determine base stations that use the separate frequency band and that are near the mobile device by obtaining a coarse location of the mobile device and using stored information regarding base stations and their locations. The location server may use knowledge of base stations that use the separate frequency band and that are near the mobile device to send a command to the mobile device to enable downloading using the separate frequency band. The mobile device may respond to this command by emulating a high data need, which causes a dedicated-band base station (e.g., a present primary base station) to provide a neighbor list to the mobile device, and the mobile device may measure signals from neighbor base stations corresponding to the neighbor list. The mobile device may report measurements from the neighbors, with the measurements from separate-band base station(s) being prioritized such that a dedicated-band base station will enable downloading using the separate-band base station. Alternatively, instead of sending the command to the mobile device, the location server may send a command to a primary cell base station, the primary cell base station may inform the mobile device of a separate-band base station to use as a secondary cell, and the mobile device and the secondary cell base station can coordinate communication, e.g., for download to the mobile device. As another alternative, the location server sending the command to the mobile device and the mobile device emulating a high data need may be omitted, but the primary cell base station providing the neighbor list to the mobile device and the mobile device measuring and prioritizing separate-band base station measurements still performed.

Items and/or techniques described herein may provide one or more of the following capabilities. Accuracy of a determined mobile device location may be improved. Separate-band (e.g., unlicensed-band) base stations may be intelligently discovered. Separate-band base stations may be used to improve mobile device location determination. Mobile device location determination accuracy may be improved without increasing positioning overhead. Better assistance data may be determined and provided to mobile devices using information about separate-band base stations discovered by a mobile device without instructions to do so from a location server or cellular base station. Supported combinations of licensed LTE bands and unlicensed LTE bands may be reported by a mobile device. An LTE licensed cell may be reselected to, where the mobile device supports multiple combinations with LTE unlicensed bands for the reselected-to LTE licensed cell. Further, it may be possible for an effect noted above to be achieved by means other than that noted, and a noted item/technique may not necessarily yield the noted effect.

Referring to FIG. 1, a wireless communication system 10 includes a mobile device 12 (also referred to as a mobile wireless communication device), short-range base stations 14-16, cellular base stations 20-23, a network 30, and a location server 32. The system 10 is a communication system in that components of the system 10 can communicate with one another directly or indirectly, e.g., via the network 30 and/or one or more of the base stations 14-16, 20-23. The mobile device 12 is shown as a smartphone, but other types of mobile devices may be used such as a laptop computer or a tablet computer. Still other mobile devices may be used, whether currently existing or developed in the future. The mobile device 12 is configured to communicate wirelessly with the base stations 14-16, 20-23. The base stations 14-16 are short-range base stations while the base stations 20-23 are cellular base stations in that the base stations 14-16 use lower transmit power than the base stations 20-23 for their respective wireless signal transmissions. Each of the base stations 14-16, 20-23 is communicatively coupled to the network 30 using, for example, a physical connection such as an electrical wire or an optical cable. The quantities of the base stations 14-16, 20-23 shown in FIG. 1 are examples used for illustration, and other quantities of short-range base stations and/or cellular base stations may be used.

The mobile device 12 is configured, and the base stations 14-16, 20-23 are configured, to have radio frequency (RF) signals sent by the base stations 14-16, 20-23 and received by the mobile device 12, and to have RF signals sent from the mobile device 12 and received by the base stations 20-23. The mobile device 12 may be called a mobile station (MS), a user equipment (UE), a terminal, a station, a device, a wireless device, a subscriber unit, a target, or other term. Each of the base stations 20-23 may be a wireless base transceiver station (BTS), a Node B, or an evolved NodeB (eNB), etc., and each of the base stations 14-16 may be a femtocell, a Home Base Station, a small cell base station, a Home Node B (HNB), a Home eNodeB (HeNB), etc. The base stations 14-16, 20-23 may be referred to herein as nodes. The network 30 may be a 2G, a 3G, a 4G, or a 5G network, a hybrid network (e.g., a 3G/4G network), a network using a technology developed in the future, or a combination of two or more of these. The mobile device 12 is configured to communicate with the network 30 using one or more radio access technologies (RATs), such as GSM (Global System for Mobile Communications), code division multiple access (CDMA), wideband CDMA (WCDMA), Time Division CDMA (TD-CDMA), Time Division Synchronous CDMA (TDS-CDMA), CDMA2000, High Rate Packet Data (HRPD), or LTE. These are examples of network technologies that may be used to communicate with the mobile device 12 over a wireless link.

The base stations 20-23 are configured to send and receive RF signals having frequencies in a dedicated frequency band, i.e., a frequency band that is dedicated for use by devices communicating in accordance with a particular communication protocol while the base stations 14-16 are configured to send RF signals having frequencies outside of the dedicated frequency band. That is, the base stations 14-16 are configured to send RF signals of frequencies in a separate frequency band from the dedicated frequency band. For example, the base stations 20-23 may be LTE nodes, such as Node Bs, that are configured to communicate using signals having frequencies in a licensed LTE frequency band (e.g., 400 MHz-3.8 GHz) while the base stations 14-16 may be LTE-U (LTE-Unlicensed) nodes that are configured to communicate using signals having frequencies outside the licensed LTE frequency band, e.g., in an unlicensed band (e.g., above 5 GHz). The discussion herein, at times, assumes that the base stations 14-16 are LTE-U base stations and that the base stations 20-23 are LTE base stations. LTE-U is a radio access technology for providing carrier-grade wireless service in the 5 GHz unlicensed frequency band. The discussion herein uses LTE as the communication protocol as an example, and consequently the base stations 20-23 as LTE nodes (LTE legacy nodes) and the base stations 14-16 as LTE-U nodes as examples, to aid in understanding. The discussion, however, is not limited to the communication protocol being LTE, the base stations 20-23 being LTE nodes, or the base stations 14-16 being LTE-U nodes. Throughout this detailed description, the discussion of an LTE node or an LTE base station is equally applicable to any dedicated frequency band node or dedicated frequency band base station, the discussion of an LTE-U node or an LTE-U base station is equally applicable to a separate frequency band node or separate frequency band base station, e.g., an unlicensed band node or unlicensed band base station, the discussion of the LTE band is equally applicable to the dedicated frequency band, and the discussion of the LTE-U band is equally applicable to the separate frequency band (i.e., a band other than the dedicated frequency band).

One of the base stations 20-23 is designated as the primary base station for communication with the mobile device 12. The primary base station (from among base stations 20-23) (sometimes referred to as the serving base station or the serving cell) is the base station with which the mobile device 12 presently manages the communication with the network 30. The primary base station may change, e.g., as the mobile device 12 moves or if the mobile device 12 reselects a primary base station, e.g., by changing a primary cell communication frequency.

As LTE-U Supplemental Downlink (SDL) is a downlink only transmission scheme from the base stations 14-16 to the mobile device 12, the base stations 14-16 have historically not been provided in a neighbor list to a server as the base stations 14-16 cannot be reselected and handed over to for bi-directional communication with the mobile device 12. Thus, the base stations 14-16 are discoverable/known to the mobile device 12 only when one of the base stations 20-23 sends a request to the mobile device 12 to add a secondary cell, with the request specifying one or more of the base stations 14-16 for the mobile device 12 to measure signals from and about which to report measurement results to the primary base station (from among base stations 20-23, where the primary base station may be the requesting base station). The base stations 14-16, however, operate using the same LTE protocol as the base stations 20-23, and are similar to the base stations 20-23 from a deployment and management perspective in that the location server 32 can determine the locations of the base stations 14-16 (e.g., stores a database of the identities and locations of the base stations 14-16). Further, the base stations 14-16 typically have much smaller cell sizes (for example, an area or range of wireless coverage of a base station) compared to base stations 20-23 because the base stations 14-16 must fairly coexist with Wi-Fi and other LTE-U nodes and thus transmit using far less power than the base stations 20-23 do. For example, an LTE-U base station may have a maximum transmit power of about 1 W while an LTE base station typically has a transmit power of 20-69 W. Consequently, the cell sizes for the base stations 14-16 are typically on the order of meters or tens of meters while the cell sizes for the base stations 20-23 are typically on the order of hundreds of meters or kilometers.

Figure 2:
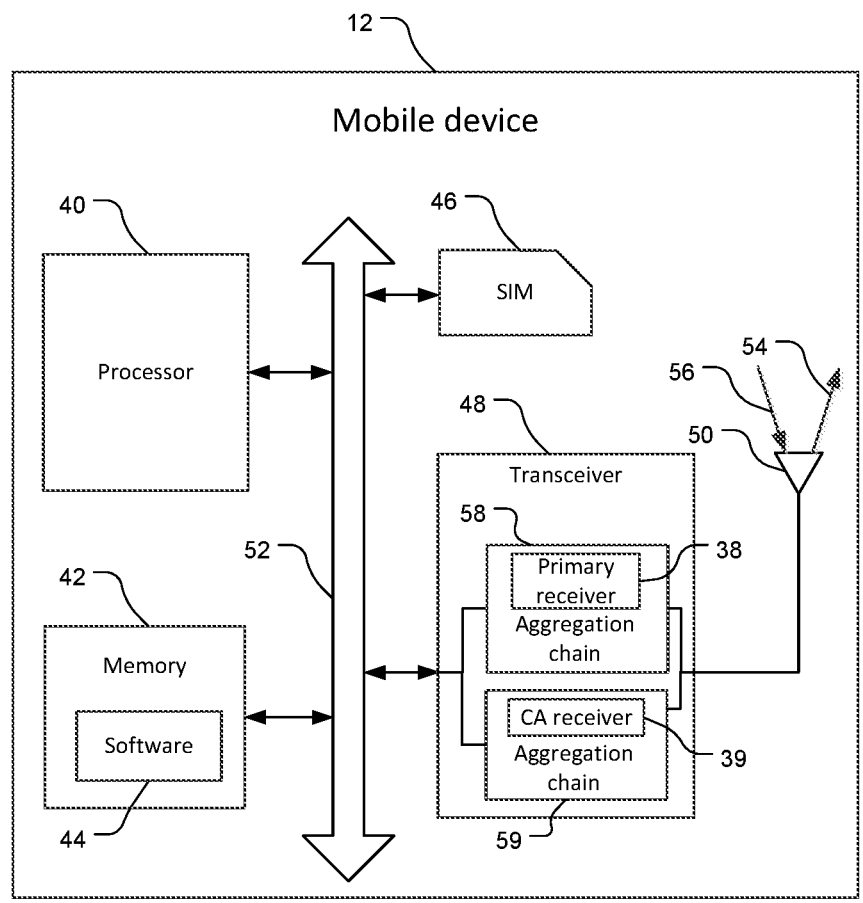
FIG. 2 is a block diagram of an example of a mobile device shown in FIG. 1.

Referring to FIG. 2, with further reference to FIG. 1, an example of the mobile device 12 includes a processor 40, a memory 42 including software 44, a subscriber identity module (SIM) 46, a transceiver 48, an antenna 50, and a bus 52. The processor 40 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 40 may comprise multiple separate physical entities that can be distributed in the mobile device 12. The memory 42 may include random access memory (RAM) and/or read-only memory (ROM). The processor 40 is communicatively coupled to the memory 42. The memory 42 is a non-transitory, processor-readable storage medium that stores the software 44 which is processor-readable, processor-executable software code containing instructions that are configured to, when performed, cause or instruct the processor 40 to perform various functions discussed herein. The description may refer only to the processor 40 performing the functions, but this includes other implementations such as where the processor 40 executes software and/or firmware. The software 44 may not be directly executable by the processor 40 and instead may be configured to, for example when compiled and executed, cause or instruct the processor 40 (that may include one or more processors) to perform the functions discussed. Whether needing compiling or not, the software 44 contains the instructions to cause or instruct the processor 40 to perform the functions. The processor 40 in combination with the memory 42 provide means for performing functions as described herein, for example, receiving and analyzing signals from base stations, and producing and sending communications to a location server with information about the base stations. The software 44 may be loaded onto the memory 42 by being downloaded via a network connection, uploaded from a disk, etc. The processor 40, the memory 42, the SIM 46, and the transceiver 48 (and by extension the antenna 50) are communicatively coupled to one another via the bus 52, with the bus 52 being configured to convey information between the components.

The SIM 46 is configured to provide access to a communication network subscription, or simply "a subscription," associated with network 30. The SIM 46 may be, for example, part of a Universal Integrated Circuit Card (UICC) and may include a processor, ROM, RAM, Electrically Erasable Programmable Read-Only Memory (EEPROM) and/or circuitry. The SIM 146 is configured to support LTE operation and LTE-U operation. The SIM 46 is configured to store user account information, an international mobile subscriber identity (IMSI), SIM application toolkit (SAT) command instructions, and storage space for additional information, such as telephone book contact information. The SIM 46 may be omitted depending upon the desired interaction with the network 30.

The transceiver 48 and the antenna 50 are communicatively coupled to each other and configured to transmit and receive signals wirelessly. The antenna 50 is configured to receive transmission signals from the transceiver 48, and to transduce and send wireless signals 54 corresponding to the transmission signals received from the transceiver 48. Further, the antenna 50 is configured to receive wireless signals 56, sent by one or more base stations, to transduce the wireless signals 56 into received signals, and to send the received signals to the transceiver 48. While the antenna 50 is shown as one physical device, the antenna 50 may comprise multiple physical devices, e.g., with different devices for sending/receiving signals of different frequencies (e.g., in different frequency bands). For example, separate physical devices could be used for sending/receiving signals in a licensed frequency band and receiving signals in an unlicensed frequency band.

The transceiver 48 includes carrier aggregation chains 58, 59 for processing the signals 56, the carrier aggregation (CA) chain 58 including a primary receiver 38 and the carrier aggregation chain 59 including a carrier aggregation receiver 39. The mobile device 12 may concurrently receive and process signals from one or more of the base stations 14-16 and one or more of the base stations 20-23. Stated differently, the mobile device 12 can concurrently process signals in a first frequency band while processing signals in the second frequency band. For example, while the aggregation chain 58 is processing signals from a primary base station, the aggregation chain 59 may be used to listen for signals of different frequencies (e.g., to scan the LTE-U band), acquire, and process signals from one of the base stations 14-16. The aggregation chains 58, 59 are configured to operate concurrently and to process signals, of the signals 56, of different carrier frequencies to decode information encoded in these signals at the same time. The information encoded in the signals 56 and decoded by the aggregation chains 58, 59 can be aggregated by the processor 40. For example, different portions of a large data set (e.g., a large file, streaming video, etc.) may be disassembled and downloaded to the mobile device 12 using the different aggregation chains 58, 59, and aggregated by the processor 40 to reassemble the data set. While two aggregation chains 58, 59 are shown, other quantities of aggregation chains may be provided.

The mobile device 12 is configured to receive signals from the base stations 14-16 and determine location information for the base stations 14-16 from which the mobile device 12 receives a signal. For example, the antenna 50 and the transceiver 48 are configured to receive the signals 56, having frequencies in an LTE-U frequency band, and transduce and provide the received signals to the processor 40 via the bus 52. For example, the signals 56 may be continuous reference signals (CRS signals) from LTE-U base stations. The processor 40 is configured to analyze the received signals to determine location information for the base stations 14-16. The location information is information that may be used, e.g., by the location server 32, to determine a location (position) of the mobile device 12. For example, the location information may include a node ID (node identity, node identification) associated with a particular one of the base stations 14-16, with the location server 32 (or other device) able to determine a relationship of node ID to location of the base station 14-16 (e.g., look up in a table mapping node ID to location). The location information may include a time of arrival of a signal that may be compared with other times of arrival of other signals to determine observed time differences of arrival. As another example, the location information may be include a received signal strength. As another example, the location information may be the actual location of the base station 14-16. The actual location may be indicated by the received signal, or the received signal may be used by the mobile device to determine a location of the base station (e.g., by sending a range to the base station 14-16 to the location server 32 for crowd-sourcing the location of the base station and receiving an indication of the location of the base station 14-16 from the location server 32).

The mobile device 12 is configured to receive signals from the base stations 20-23 and determine information regarding each of the base stations 20-23 from which the mobile device 12 receives a signal. For example, the processor 40 can analyze inbound signals, having frequencies in an LTE licensed frequency band, received from the base stations 20-23 via the antenna 50, the transceiver 48, and the bus 52 to determine a node ID for each of the base stations 20-23 from which a signal is received. The processor 40 can distinguish LTE cells from LTE-U cells based on the frequencies of the signals received, as the processor 40 identifies signals having frequencies above 5 GHz (presently 5.15-5.35 GHz and 5.47-5.85 GHz in the United States, 5.15-5.35 GHz and 5.47-5.725 GHz in Europe and Japan, and 5.15-5.35 GHz and 5.725-5.85 GHz in China) as LTE-U signals, while LTE signals have frequencies at or below 3.8 GHz.

Figure 5:
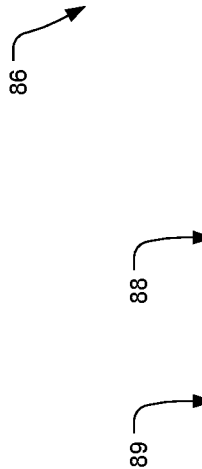
FIG. 5 is a table of frequency band compatibility combinations.

The processor 40 is further configured to provide one or more indications of one or more frequency band compatibility combinations to the location server 32 via the transceiver 48. The mobile device 12 is configured to operate concurrently with at least one combination of a frequency in the dedicated frequency band and a frequency in the separate frequency band (e.g., an LTE frequency and an LTE-U frequency). That is, the mobile device 12 can perform signal transmission or reception in the dedicated frequency band concurrently while performing signal reception in the separate frequency band. Referring also to FIG. 5, a table 86 includes combinations 88 of compatible LTE and LTE-U frequency bands. The frequencies in each of the combinations 88 of frequency bands in the table 86 are compatible in that signals of frequencies in the bands in any one combination (among the combinations 88) will not significantly interfere with each other, e.g., one is not a harmonic of the other. The frequencies in any one of the combinations 88 can be concurrently used for wireless data reception by the mobile device 12, or transmission in the dedicated frequency band and reception in the separate frequency band. Each of the combinations 88 includes at least one band in a dedicated band for a communication protocol, e.g., the LTE band, and at least one band in a band separate from the dedicated band, e.g., a non-dedicated band such as the LTE-U band. The processor 40 is configured to send to the location server 32 an indication of a compatible frequency band combination, of the combinations 88, that the mobile device 12 supports. For example, the processor 40 may send an indication of each and every compatible frequency band combination, of the combinations 88, that the mobile device 12 supports. Which frequency band compatibility combination(s) 88 the mobile device 12 supports may depend on one or more factors such as configuration of hardware, e.g., the antenna 50 and/or the transceiver 48 and/or one or more other components of the mobile device 12, and/or a subscription associated with the mobile device 12. For example, a frequency band associated with a particular service provider for which a user of the mobile device 12 does not have a subscription, e.g., the SIM 46 is not compatible with the particular service provider, will not be supported by the mobile device 12.

The processor 40 may be configured to provide the indication(s) of the frequency band compatibility combination(s) 88 in one or more of a variety of ways. For example, the processor 40 may provide index numbers 89 corresponding to respective ones of the compatible frequency band combinations 88 supported by the mobile device 12. Also or alternatively, the processor 40 may list the bands in supported band combinations, of the combinations 88, with an indication of which bands are in each of the combinations 88, e.g., with a plus sign connecting indications of bands in a combination.

The processor 40 is further configured to send a message to the location server 32 with the location information for one or more of the base stations 14-16 and information regarding one or more of the base stations 20-23. The processor 40 is configured to produce an outbound message including the location information, such as the node ID, for each of the base stations 14-16 from which a signal was received and information, such as a node ID, of each of the base stations 20-23 from which a signal was received. The processor 40 may produce the outbound message to include information for less than all of the base stations 14-16, 20-23 from which a signal is received. For example, the processor 40 may produce the outbound message to include, from among the base stations 20-23, only the base station 20-23 from which a signal was most recently received, or that is presently acting as the serving or primary base station (primary cell) for the mobile device 12. The outbound message may include information for each of the base stations 14-16 from which the mobile device is presently receiving a signal, and possibly for each of the base stations 14-16 from which the mobile device recently (e.g., within a threshold amount of time) received a signal. The processor 40 is configured to send the outbound message as part of a "provide capability message" sent to the location server 32. The processor 40 may be configured to produce the outbound signal such that the location information for all of the base stations 14-16 (all LTE-U base stations) indicated by the outbound signal is prioritized ahead of any of the base stations 20-23 (e.g., any LTE base station) that is indicated by the outbound signal. Thus, for example, if the mobile device 12 cannot report all the base stations 14-16, 20-23 from which the mobile device 12 has recently received a signal, the LTE-U base stations 14-16 are prioritized for reporting as the base stations 14-16 will likely be more useful in determining a coarse location of the mobile device 12. The processor 40 can send the outbound message to the location server 32 via an outbound signal transmitted by the antenna 50 using the protocol of the base stations 20-23. Thus, for example, the processor 40 sends the outbound message as an LTE message to the primary (serving) cell of the base stations 20-23. Traditionally, a mobile device would only inform the location server of the serving cell of the mobile device and perhaps one or more neighbor LTE base stations. The prioritizing indicates a preference of use of the reported base stations for appropriate use(s).

The processor 40 is configured to listen for base station signals in the separate frequency band, e.g., the LTE-U band. The processor 40 can scan a frequency band by listening for signals of frequencies across the band, e.g., to attempt to acquire signals and report node identities encoded in the signals that identify the sources or the signals. The processor 40 may scan a frequency band to discover neighboring base stations. For example, the processor 40 may respond to a location request, e.g., a mobile-originated location request or a network-initiated location request, for a location of the mobile device 12 by scanning the LTE-U band for LTE-U base stations. Also, the processor 40 can listen to specific frequencies to acquire and measure signals from neighbor base stations, and report measurement results, e.g., to the primary cell base station and possibly to the location server 32. For example, the processor 40 may be configured to listen only for signals from LTE-U base stations whose frequencies are included in a list of neighbor base stations received from the location server 32. For example, the processor 40 may be configured to analyze the neighbor list and only listen for signals at frequencies listed in the neighbor list. The neighbor list may include frequencies of signals (e.g., PRS signals) used by neighboring base stations and may identify the respective LTE-U base stations corresponding to those frequencies. The processor 40 may be configured to listen to every frequency in the neighbor list that is in the LTE-U band before listening to any frequency in the LTE band. The processor 40 can determine and report a physical cell identity (PCI) of each of the base stations 14-16 from which the processor 40 acquires a signal. The neighbor list may include indications of neighbor base stations that use the dedicated frequency band, and the processor 40 may be configured to measure signals from these neighbor base stations and report measurement results, e.g., to the primary cell base station and possibly to the location server 32. The neighbor list may be provided in assistance data sent from the location server 32 to the mobile device 12.

The processor 40 may further be configured to receive assistance data and use the assistance data to acquire signals for use in determining location of the mobile device 12. The processor 40 is configured to receive, via the antenna 50, assistance data from the location server 32, with the assistance data including information to help the mobile device 12 obtain information for use in determining the position of the mobile device 12. For example, the assistance data may include information, such as frequencies used by nearby base stations, to help the mobile device obtain measurements for use in OTDOA positioning. The assistance data may include information regarding neighbor base stations (such as base stations 14-16 and/or 20-23) and the processor 40 may listen for signals from the neighbor base stations. The processor 40 may, in accordance with the assistance data, listen for signals from the base stations using the separate frequency band, e.g., the LTE-U nodes, before listening for signals from base stations using the dedicated frequency band. The processor 40 may listen for the signals based on indications of priority included in the assistance data, and/or may interpret the assistance data to determine the listen order, e.g., prioritizing frequencies in the separate frequency band for listening before frequencies in the dedicated frequency band. The assistance data may include a search window for each of the base stations 20-23. Each search window is a period of time during which the location server 32 expects a PRS signal emitted by one of the base stations 20-23 to reach the mobile device 12. Each search window is thus a period of time during which the mobile device 12 should listen for, to try to acquire, the respective PRS signal. The processor 40 is configured to use the assistance data by searching for the respective PRS signals only during the respective search windows indicated by the assistance data. That is, the processor 40 is configured to wait for the respective search window for the respective base station 20-23 to search for the respective PRS signal. The search windows are typically provided as a search window center time relative to a receive time of a reference signal, plus a window size. The window center is an expected Reference Signal Time Difference (RSTD) and the window size is an RSTD uncertainty. The reference signal may be the PRS signal of the primary cell of the mobile device 12. Further, more than one search window may be provided for a single one of the base stations 20-23 as the base stations 20-23 repeatedly send their PRS signals. The assistance data may thus include information for multiple search windows and may provide this information in various formats, e.g., a periodicity or repetition interval such as a duration between consecutive search window centers (or other reference point of each of the search windows). The processor 40 is configured to search for a respective PRS signal during a first search window, discontinue searching for that PRS signal at the end of the first search window, wait until a second search window indicated by the assistance data for that PRS signal, and then search again for the PRS signal during the second search window. This process may be repeated until the PRS signal is acquired or a limit of search windows is reached. The limit of search windows may, for example, be indicated by the assistance data or may be a default number stored in the memory 42, or may be obtained by or provided to the processor 40 is some other way.

The mobile device 12 may further be configured to report information regarding base stations from which signals have been acquired in a ranked list of base stations. Ranking the base stations in the report to the location server 32 data may be used to help ensure enablement of use of the LTE-U base stations, e.g., the base stations 14-16, which may improve accuracy of a determined location of the mobile device 12. For example, the processor 40 may be configured to rank any of the LTE-U base stations being reported to the location server 32 higher than any of the LTE base stations being reported to the location server 32. Further, the processor 40 may be configured to rank the LTE-U base stations to be reported that appear in one of the frequency band compatibility combinations for the mobile device 12 higher than the LTE-U base stations to be reported that do not appear in one of the frequency band compatibility combinations for the mobile device 12. The processor 40 may rank the LTE-U nodes higher than the LTE nodes because the LTE-U nodes, having a smaller cell size, may be more helpful in determining the location of the mobile device 12, e.g., in determining the location of the mobile device more 12 accurately than without using signals from one or more LTE-U nodes. The ranking of the base stations may be indicated in any of a variety of manners, examples of which are shown in Tables 1-2. In the examples of Tables 1-2, the base stations 14-16 are LTE-U base stations and the base stations 20-23 are LTE base stations. As shown in Table 1, the base stations may be listed in order of rank, e.g., with the higher-ranked base stations listed above the lower-ranked base stations.

TABLE 1

| Node ID | Other information |
|---------|-------------------|
| 15 | — |
| 14 | — |
| 22 | — |
| 20 | — |
| 21 | — |

In Table 1, the ranked list shows the base stations 14-15, 20-22 in their ranked order. In this example, the base stations 16, 23 are not listed indicating that in this case the mobile device 12 did not acquire signals from the base stations 16, 23. The "other information" provided may include any variety of information, such as ranging information, based on a received signal from the respective base station, useful in determining the location of the mobile device 12. Thus, the "other information" may include RSTD measurement values, and/or RSSI (received signal strength indication) measurement values, etc. In Table 1 above, no values are shown in the "other information" column as Table 1 is illustrative only, and in an actual implementation, data would populate the column based on measurements performed by the mobile device 12.

TABLE 2

| Node ID | Rank | Other information |
|---------|------|-------------------|
| 14 | 2 | — |
| 15 | 1 | — |
| 20 | 4 | — |
| 21 | 5 | — |
| 22 | 3 | — |

In Table 2, as another example similar to Table 1, the ranked list provides a rank number indicating the order in which the base stations 14-15, 20-22 are ranked, with the rankings in Table 1 and Table 2 being the same.

Figure 3:
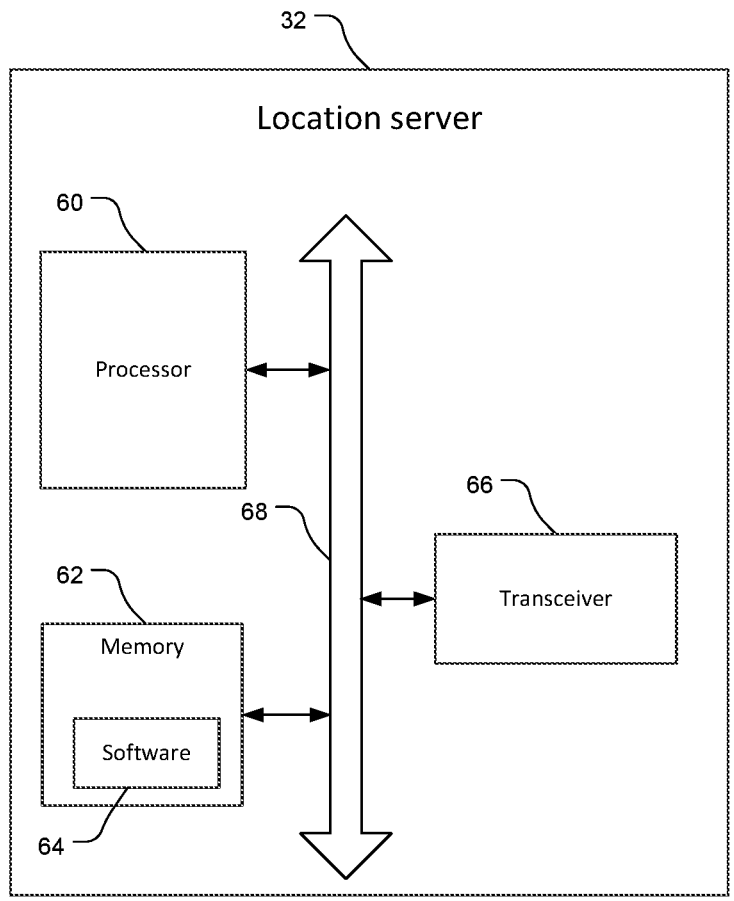
FIG. 3 is a block diagram of an example of a location server shown in FIG. 1.

Referring to FIG. 3, with further reference to FIGS. 1-2, an example of the location server 32 includes a processor 60, a memory 62 including software 64, a transceiver 66, and a bus 68. The processor 60 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 60 may comprise multiple separate physical entities that can be distributed in the location server 32. The memory 62 may include random access memory (RAM) and/or read-only memory (ROM). The processor 60 is communicatively coupled to the memory 62. The memory 62 is a non-transitory, processor-readable storage medium that stores the software 64 which is processor-readable, processor-executable software code containing instructions that are configured to, when performed, cause or instruct the processor 60 to perform various functions discussed herein. The description may refer only to the processor 60 performing the functions, but this includes other implementations such as where the processor 60 executes software and/or firmware. The software 64 may not be directly executable by the processor 60 and instead may be configured to, for example when compiled and executed, cause or instruct the processor 60 (that may include one or more processors) to perform the functions discussed. Whether needing compiling or not, the software 64 contains the instructions to cause or instruct the processor 60 to perform the functions. The processor 60 in combination with the memory 62 provide means for performing functions as described herein, for example, receiving and analyzing signals from the mobile device 12, producing and sending communications to the mobile device 12 with information about the base station signals, and determining coarse and fine locations (positions) of the mobile device 12. The software 64 may be loaded onto the memory 62 by being downloaded via a network connection, uploaded from a disk, etc. The processor 60, the memory 62, and the transceiver 66 are communicatively coupled to one another via the bus 68, with the bus 68 being configured to convey information between the components. The transceiver 66 is configured to send signals to the network 30, and from there to one or more of the base stations 14-16, 20-23 and/or the mobile device 12 as appropriate, to convey information provided by the processor 60. The transceiver 66 is also configured to send signals to the processor 60 to convey information received from the network 30, originating from the mobile device 12 and/or one or more of the base stations 14-16, 20-23.

The location server 32 may be one of a variety of server types. For example, the location server 32 may be an Evolved Serving Mobile Location Centre (E-SMLC), a Secure User Plane Location (SUPL) Location Platform (SLP), a SUPL Location Center (SLC), a SUPL Positioning Center (SPC), a Position Determining Entity (PDE) and/or a gateway mobile location center (GMLC), that may connect to one or more location retrieval functions (LRFs) and/or mobility management entities (MMEs).

The processor 60 is configured to analyze signals received from the mobile device 12 to determine a coarse location of the mobile device 12. The processor 60 analyzes the outbound message received from the mobile device 12 to determine the base stations 14-16, 20-23 in the vicinity of the mobile device 12. By analyzing the locations of these base stations, either known by the location server 32 (i.e., stored in the memory 62 or obtained by the processor 60 (e.g., requested from another device)) or provided in the outbound message, the processor 60 can determine a coarse location (i.e., a location estimate) for the mobile device 12. In particular, the processor 60 analyzes the outbound message from the mobile device 12 for indications of LTE-U base stations because the cell sizes for the LTE-U base stations are typically much smaller than the cell sizes for LTE base stations and thus may provide a better indication of the location of the mobile device 12. With the mobile device 12 reporting one or more of the base stations 14-16 in the outbound message, and knowing the location(s) of the one or more base stations 14-16, the processor 60 can determine a coarse location for the mobile device 12 with better accuracy typically than if no LTE-U base station is reported in the outbound message. The coarse location of the mobile device 12 may include some uncertainty and may be expressed as a point location plus an uncertainty, e.g., a radius. The coarse location may be determined using a combination of information from multiple base stations, e.g., RSSI measurements from multiple base stations and the locations of the base stations for use in performing trilateration. Alternatively, the location of the mobile device 12 may be assumed to be the location of the base station 14-16, 20-23 from which the strongest RSSI is determined (accounting for differences in transmission power from the base stations 14-16 and the base stations 20-23).

The processor 60 may further be configured to determine base stations neighboring the mobile device 12. The processor 60 can use the coarse location of the mobile device 12 to determine the base stations 14-16, 20-23 that neighbor the mobile device 12. Preferably, the processor 60 determines the base stations 20-23 that neighbor the mobile device 12 and that are well-distributed geographically about the mobile device 12 to provide a GDOP (geometric dilution of precision) that is lower than a GDOP that would be achieved by providing a list of neighbors derived from a coarse location of the mobile device 12 that was based upon a data (such as, for example, the outbound message) that did not include an LTE-U base station. The GDOP is a ratio of the change in output location determined based on a change in measured data, or the range of possible locations based on measured data plus uncertainty. For example, the more evenly base stations are distributed around a mobile device, both in terms of angular location and distance from the mobile device, the better the GDOP will typically be. The processor 60 is configured to send the list of neighbor base stations to the mobile device 12 via the bus 68 and the transceiver 66 internally to the location server 32, and via the network 30 and the serving cell of the base stations 20-23.

The processor 60 is configured to compile and send assistance data to the mobile device 12. For example, the processor 60 sends a list of the neighbor base stations 14-16, 20-23, including node IDs, along with information to help the mobile device 12 acquire the PRS signals of the neighbor base stations 20-23. The information to help the mobile device acquire the PRS signals may, for example, include the channels (corresponding to frequency bands) that the PRS signals will be on, and the RSTD values of the PRS signals and the uncertainties associated with these RSTD values. Alternatively, the node IDs may be omitted from the list of the neighbor base stations (i.e., the neighbor list).

The processor 60 may be configured to send a supplemental downlink addition command to the mobile device 12 and/or to one or more of the base stations 20-23. The processor 60 may send an enable SDL addition command to the mobile device 12 to instruct the mobile device 12 to work with the primary cell base station (from among, for example, the base stations 20-23) to establish a secondary cell for data download. The processor 60 may only send the SDL addition command if the processor has determined that there is at least one neighboring LTE-U base station to avoid wasting mobile device processing time (e.g., to emulate a high data need). The link to a secondary cell may be used for data download as well as determining position of the mobile device 12. Also or alternatively, the processor 60 may be configured to send a supplemental downlink addition command to one or more of the base stations 20-23 to instruct the base station 20-23 to work with the mobile device 12 to enable supplemental downlink.

Figure 4:
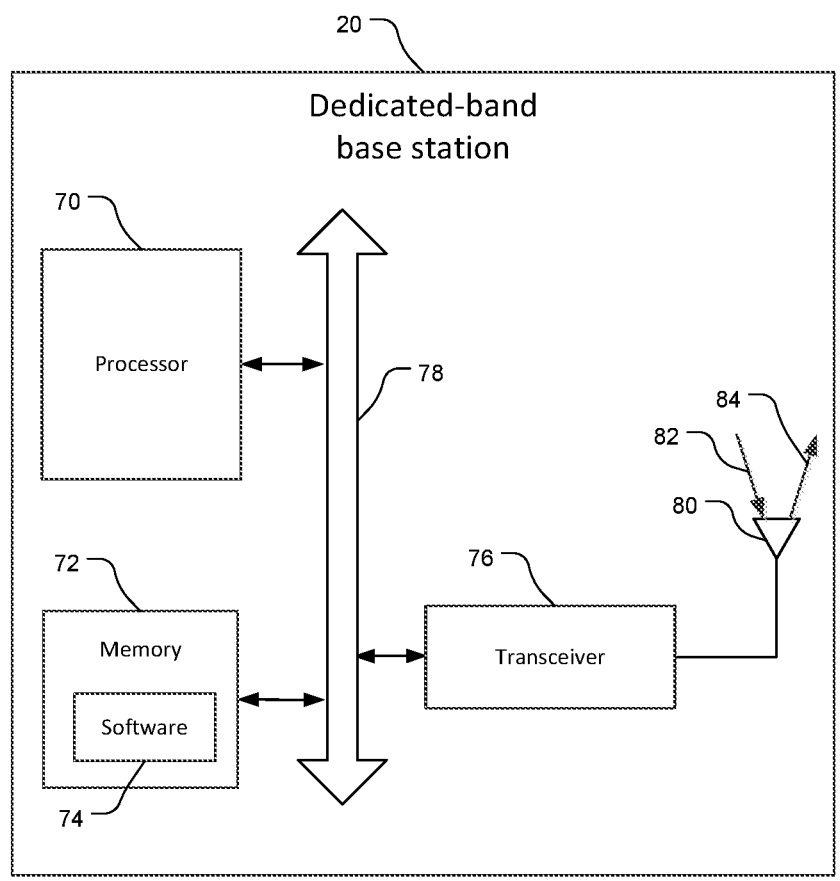
FIG. 4 is a block diagram of an example of a dedicated-band base station shown in FIG. 1.

Referring to FIG. 4, with further reference to FIGS. 1-2, an example of the base station 20 (which can be a dedicated-band base station such as any of base stations 20-23) includes a processor 70, a memory 72 including software 74, a transceiver 76, a bus 78, and an antenna 80. The processor 70 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 70 may comprise multiple separate physical entities that can be distributed in the base station 20. The memory 72 may include random access memory (RAM) and/or read-only memory (ROM). The processor 70 is communicatively coupled to the memory 72. The memory 72 is a non-transitory, processor-readable storage medium that stores the software 74 which is processor-readable, processor-executable software code containing instructions that are configured to, when performed, cause or instruct the processor 70 to perform various functions discussed herein. The description may refer only to the processor 70 performing the functions, but this includes other implementations such as where the processor 70 executes software and/or firmware. The software 74 may not be directly executable by the processor 70 and instead may be configured to, for example when compiled and executed, cause or instruct the processor 70 to perform the functions discussed. Whether needing compiling or not, the software 74 contains the instructions to cause or instruct the processor 70 (that may include one or more processors) to perform the functions. The processor 70 in combination with the memory 72 provide means for performing functions as described herein, for example, receiving and analyzing signals from the mobile device 12, and producing and sending communications to the mobile device 12 with information about base stations and base station signals. The software 74 may be loaded onto the memory 72 by being downloaded via a network connection, uploaded from a disk, etc. The processor 70, the memory 72, and the transceiver 76 are communicatively coupled to one another via the bus 78, with the bus 78 being configured to convey information between the components. The transceiver 76 is configured to send and receive signals to and from the network 30, and to send and receive signals to and from the mobile device 12, with sent signals conveying information from the processor 70 and information from received signals be provided to the processor 70.

The transceiver 76 and the antenna 80 are communicatively coupled to each other and configured to transmit and receive signals wirelessly. The antenna 80 is configured to receive transmission signals from the transceiver 76, and to transduce and send wireless signals 84 corresponding to the transmission signals received from the transceiver 76. Further, the antenna 80 is configured to receive wireless signals 82, sent by one or more mobile devices, to transduce the wireless signals 82 into received signals, and to send the received signals to the transceiver 76.

The processor 70 is configured to provide a neighbor list of base stations 14-16, 20-23 to the mobile device 12. For example, the processor 70 may receive an indication from the mobile device 12 that the mobile device has a high data need, e.g., exceeding the amount of data that can be provided and processed by the mobile device 12 from the base station 20. The processor 70 may be configured to respond to this indication by providing a neighbor list to the mobile device 12, the neighbor list including information regarding base stations 14-16, 20-23 near the mobile device 12. The list of nearby base stations may be based on the coarse location of the mobile device 12, e.g., as determined by the location server 32, e.g., as discussed above. The neighbor list may or may not include node IDs. The neighbor list may include specific frequencies used by base stations for transmitting signals, e.g., PRS signals, and may only include frequencies within at least one band reported in the sets of combinations 88, or may include one or more frequencies in one or more of the bands in the combinations 88 and/or one or more frequencies outside the bands in the combinations 88. As another example, the processor 70 may receive an enable supplemental downlink addition command from the location server 32 and respond to this command by providing the neighbor list to the mobile device 12. As yet another example, the processor 70 may respond to the enable supplemental downlink addition command from the location server 32 by sending to the mobile device 12 a reconfiguration message (e.g., a radio resource control (RRC) connection reconfiguration message in LTE) specifying one of the base stations 14-16 to add as a secondary cell (SCELL). In this case, the processor 70 is configured to respond to a response from the mobile device 12 to the reconfiguration message by enabling supplemental downlink. The processor 70 may communicate with the mobile device 12 to enable the supplemental downlink.

Figure 6:
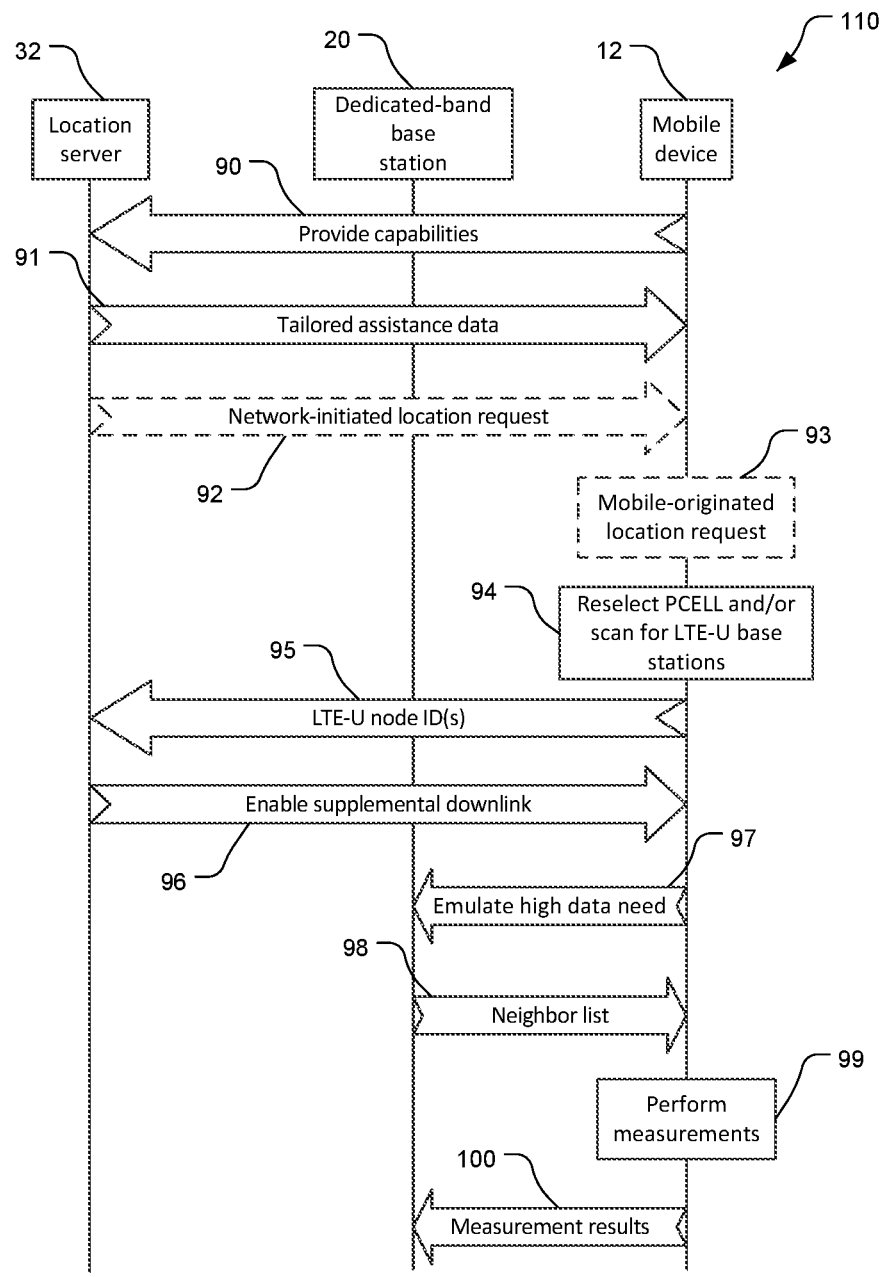
FIG. 6 is a flow diagram of communications among the mobile device, the location server, and the dedicated-band base station shown in FIGS. 2-4, respectively.

Referring to FIG. 6, with further reference to FIGS. 1-5, an operational flow 110 has the location server 32, the mobile device 12, and base stations, here the base station 20 exchanging several messages and performing several operations. In this example, the base station 20 is discussed below as an LTE base station. FIG. 6 is thus an example of message exchanges in an LTE and LTE-U implementation, but as mentioned above, the discussion is applicable to other protocols using messages in a dedicated frequency band and a frequency band separate from the dedicated frequency band.

The mobile device 12 sends, to the location server 32, a provide capabilities message 90 that includes information about the capabilities of the mobile device 12. Thus, the mobile device 12 shares one or more frequency band combinations (e.g., of LTE and LTE-U bands) that allow supplemental downlink support for the mobile device 12. The provide capabilities message 90 includes one or more frequency band compatibility combinations indicating sets of frequencies that the mobile device 12 supports for concurrent signaling. For example, the mobile device 12 may provide one or more indications of combinations shown in the table 86 as combinations of LTE and LTE-U frequencies for which the mobile device 12 can concurrently process signals. While the discussion herein may refer to frequency band compatibility combinations, plural, this includes only a single such combination being used, supported, sent, etc. Further, the capabilities message 90 may include one or more indications of one or more respective LTE bands, and/or one or more indications of one or more respective LTE-U bands, in addition to the at least one combination of LTE and LTE-U bands.

The location server 32 provides tailored assistance data 91 to the mobile device 12. The location server 32 uses the frequency band compatibility combination(s) provided by the mobile device 12 in the provide capabilities message 90 to determine what assistance data and in what manner the assistance data are provided to the mobile device 12. The location server 32 may tailor the assistance data in a manner that facilitates, e.g., best allows, supplemental downlink to be used by the mobile device 12. For example, the location server 32 prioritizes information for the primary cells (PCELLs), i.e., information for the base stations 20-23, that are compatible with operation of one or more of the base stations 14-16 for supplemental downlink with the mobile device 12. For example, the location server 32 indicates to the mobile device 12 in the tailored assistance data an order in which the mobile device 12 should attempt to establish a primary cell among the base stations 20-23, with the higher-prioritized ones of the base stations 20-23 being able to operate using a frequency in the frequency band compatibility combination(s) provided in the provide capabilities message 90. Further, if there are multiple one of the base stations 20-23 that can each operate using a frequency (although possibly different frequencies) in the frequency band compatibility combination(s), then the location server 32 may prioritize the base stations 20-23 based on the likelihood of the mobile device 12 being able to use the base station 20-23 and one of the base stations 14-16 concurrently. For example, the location server 32 may prioritize the base station 20-23 that is compatible with more of the base stations 14-16 near the mobile device 12 higher than another of the base stations 20-23. Tailoring the assistance data helps ensure that supplemental downlink is enabled during a positioning session with the mobile device 12, which may help improve accuracy of a determined position of the mobile device 12.

A positioning session may be initiated by the location server 32 or by the mobile device 12. The location server 32 can initiate the positioning session by sending a network-initiated location request (NILR) 92 to the mobile device 12. Sending the NILR 92 is optional as indicated by the dashed lines for the NILR arrow. The mobile device 12 can initiate the positioning session by a mobile-originated location request (MOLR) 93. The MOLR is optional as indicated by the dashed lines for the MOLR block 93.

At a block 94, the mobile device 12 may reselect a primary cell (i.e., the base station 20-23 serving as the primary cell base station) and/or scan for LTE-U base stations. The processor 40 may respond to the NILR or the MOLR by reselecting the primary cell during the initiation of the positioning session to allow SDL using an LTE-U base station when the mobile device 12 has many bands/cells that satisfy selection criteria. The selection criteria may include a sufficient power level of a received signal for the mobile device 12 to acquire to use a corresponding cell as the primary cell. For example, the mobile device 12 may change from using one of the base stations 20-23 as the (former) primary cell where that base station does not (e.g., cannot) operate using a frequency in the sets of frequency band compatibility combinations 88 supported by the mobile device 12, to using another of the base stations 20-23, as the (present) primary cell, that operates using a frequency in at least one of the sets of frequency band compatibility combinations supported by the mobile device 12. The processor 40 may be configured to reselect the primary cell by selecting a new frequency (that is in at least one of the combinations 88), that then leads to a change in the base station 20-23 used as the primary cell.

Also or alternatively at block 94, the mobile device 12 may respond to the NILR or the MOLR by scanning for LTE-U base stations. Typically, as LTE-U nodes are downlink only nodes, they do not appear in neighbor lists provided by the base stations 20-23 for reselection and handover. Thus, typically, the LTE-U nodes are discoverable/known to the mobile device 12 only when the location server 32 or the base station 20-23 sends a secondary cell addition request specifying potential LTE-U nodes to measure and report. Here, however, the mobile device 12, and in particular the processor 40, is configured to scan for the LTE-U base stations 14-16 without information specifying the base stations 14-16. The processor 40 may scan (i.e., be configured to scan) the LTE-U band or, preferably, only each of the LTE-U frequency bands in the sets of frequency band compatibility combinations 88 supported by the mobile device 12 and reported to the location server 32. For example, the processor 40 may cause a carrier aggregation receive chain, e.g., the carrier aggregation receiver 39 of the carrier aggregation chain 59, to be used to scan across multiple frequency bands in the LTE-U band to attempt to acquire a signal from one or more of the base stations 14-16.

The mobile device 12 may report the LTE-U node ID(s) 95 to the location server 32. In response to scanning for the LTE-U base stations 14-16, and acquiring a signal from each of one or more of the base stations 14-16, the processor 40 may determine the node identity(ies) from the acquired signal(s) and send the node identity(ies) to the location server 32. This information may help the location server 32 stay up to date and provide better assistance data, with more information regarding LTE-U base stations. Block 95 need not be performed each time a location request is received because there may not be an expected change in the neighbor LTE-U nodes. Further, blocks 94 and 95 may be omitted, e.g., if the location server 32 is up to date or at least is believed or expected to be up to date.

The location server 32 sends an enable supplemental downlink 96 signal to the mobile device 12. The location server 32 determines the LTE-U nodes in proximity to the mobile device 12, e.g., from information provided by the mobile device such as the LTE-U node ID(s) 95 and from information stored by the location server 32 in the memory 62 (e.g., stored location(s) corresponding to the node ID(s) 95). Further, the location server 32 sends the enable supplemental downlink 96 signal as a command to instruct the mobile device 12 to cooperate with the base station 20 to establish a supplemental downlink using an LTE-U node.

In response to the enable supplemental downlink 96 signal, the mobile device 12 and the base station 20 cooperate to establish a supplemental downlink. The mobile device 12 emulates a high data need 97 whether the mobile device 12 presently has a higher data need or not. For example, the processor 40 may initiate a background data download. The processor 40 may do so by sending an indication in an application layer to the base station 20 to start a data download. The mobile device 12 may emulate the high data need in response to failing to acquire a signal from an LTE-U base station during the scanning 94. If emulated, the emulated data need is high enough such that the base station 20 will work with the mobile device 12 to establish a supplemental downlink using an LTE-U node. The base station 20 response to the indicated high data need by sending the mobile device a neighbor list indicating nearby ones of the base stations 14-16, 20-23 for the mobile device 12 to acquire signals from, measure information regarding those signals, and report the results of these measurements to the base station 20 so that the best node may be selected for use as the secondary cell for the supplemental downlink. The best node may be the node that is the source of the signal with the highest received power (e.g., as indicated by a value of a Reference Signal Received Power (RSRP) in LTE) and/or the highest received quality (as indicated by a value of a Reference Signal Received Quality (RSRQ) in LTE). How the best node is determined may depend on one or more of various factors such as strength of received signal, proximity of the node to the coarse location of the mobile device 12, frequency compatibility with one or more of the base stations 20-23, etc.

The mobile device 12 performs measurements 99 and reports measurement results 100 to the base station 20. The mobile device 12 listens for and acquires signals from the base stations indicated by frequencies in the neighbor list 98, measures the signals, and determines ranging information, e.g., appropriate characteristics such as RSSIs, RSTD, etc., based on the measured signals. The mobile device 12 reports the measurement results 100 (e.g., raw measurement values and/or the determined ranging information) to the location server 32 via the base station 20. The mobile device 12 may use stored LTE-U node frequencies to rank LTE-U base stations (i.e., the short-range base stations), here the base stations 14-16, above LTE base stations (i.e., the long-range base stations), here the base stations 20-23, from which signals are acquired so that the base station 20 will enable the LTE-U SDL. The measurement results may then be used in positioning techniques by the location server 32 to determine the location of the mobile device 12. The ranging information is indicative of a range from the mobile device 12 to a source base station of the respective signal. The measurement results may be provided by the base station 20 to the location server 32 and in response to receiving the measurement results, the location server 32 may instruct the mobile device 12 to use the LTE-U node with the smallest range as the secondary cell even this means changing the secondary cell.

Figure 7:
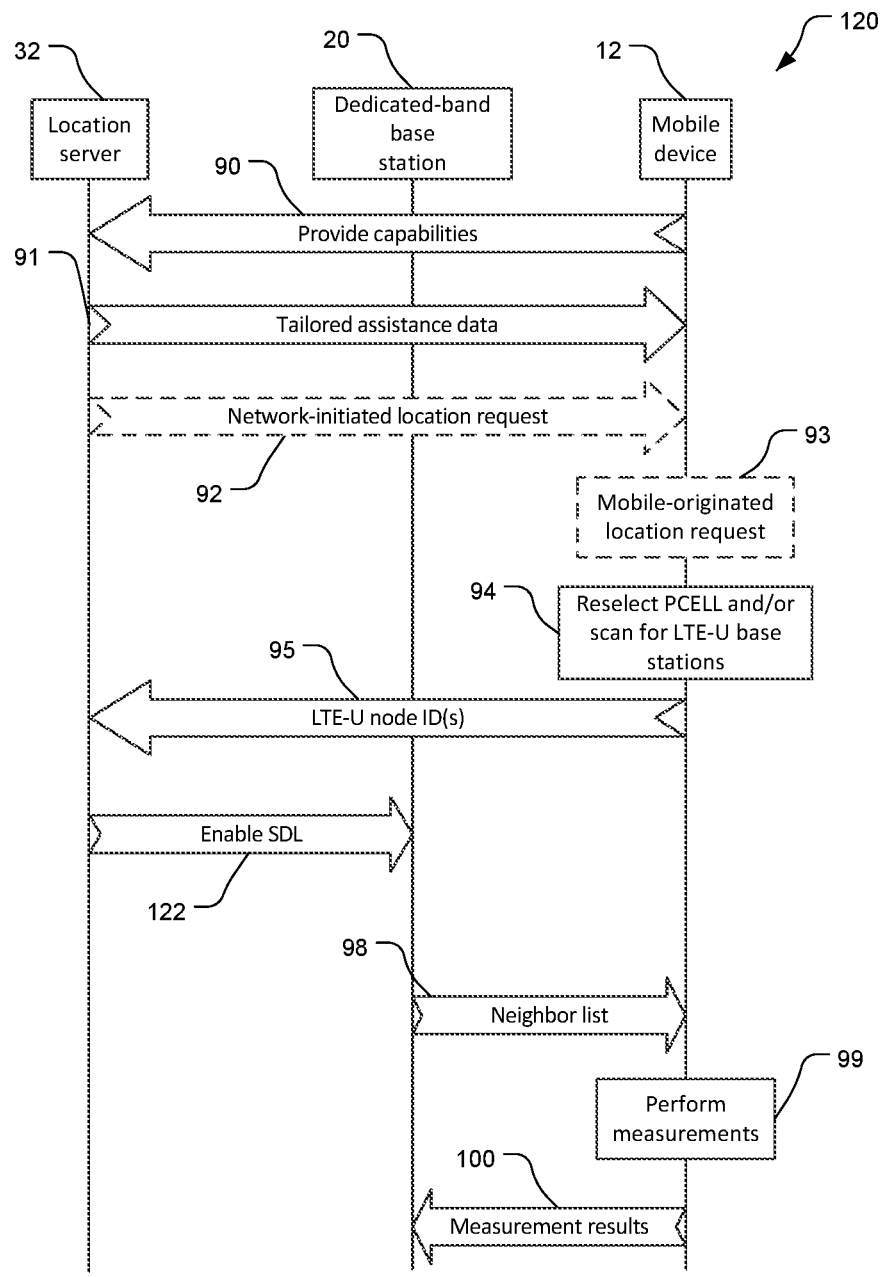
FIG. 7 is another flow diagram of communications among the mobile device, the location server, and the dedicated-band base station shown in FIGS. 2-4, respectively.

Referring to FIG. 7, with further reference to FIGS. 1-6, an operational flow 120 has the location server 32, the mobile device 12, and base stations, here the base station 20 exchanging several messages and performing several operations. The operational flow 120 is similar to the operational flow 110, except that instead of the location server 32 sending the enable supplemental downlink 96 signal to the mobile device 12, the location server 32 sends an enable supplemental downlink 122 signal to the base station 20. The operational flow 120 also differs from the operational flow 110 in that in the operational flow 120, operation 97 is omitted. In operational flow 120, the base station 20 responds to receiving the enable supplemental downlink 122 signal by sending the neighbor list 98 to the mobile device 12. The operational flow 120 then proceeds similar to the operational flow 110, performing operations in the blocks 99 and 100.

Figure 8:
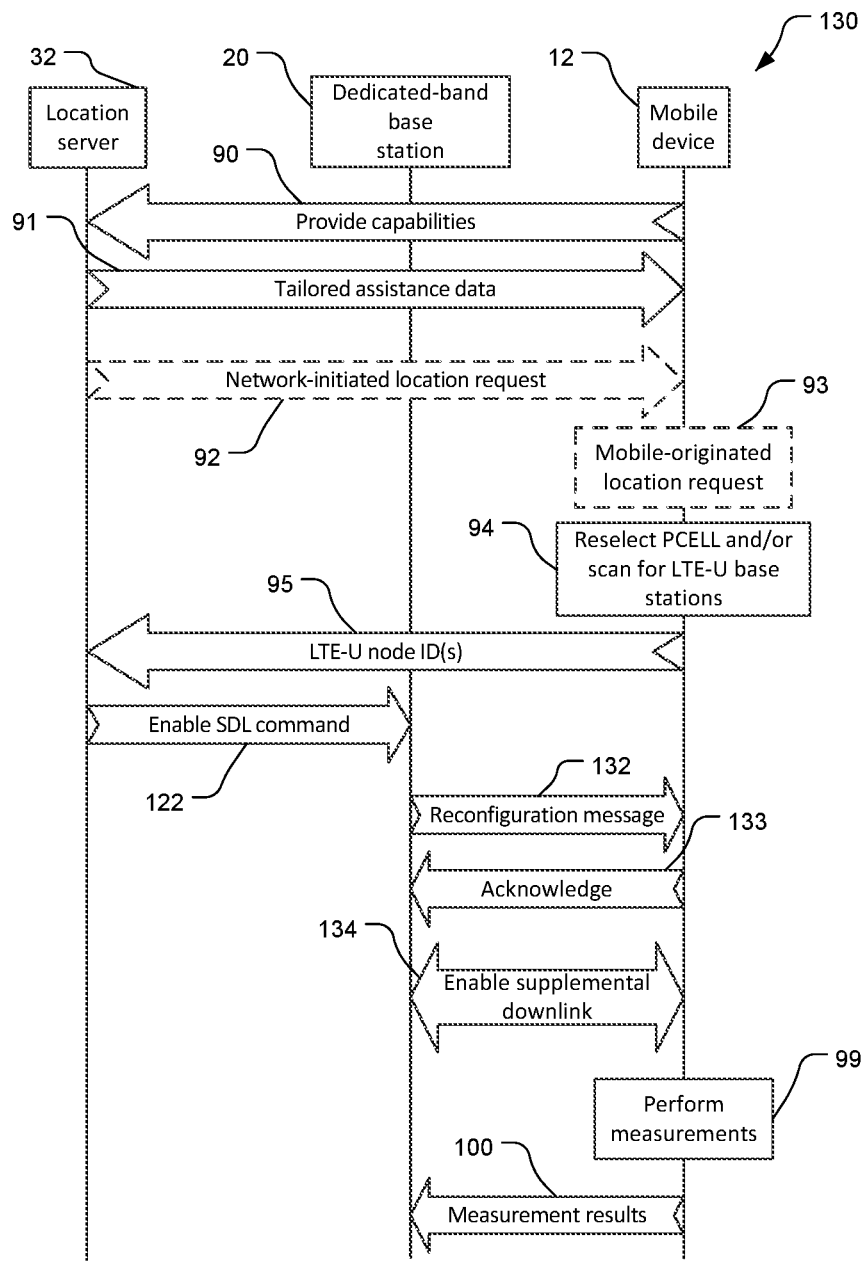
FIG. 8 is another flow diagram of communications among the mobile device, the location server, and the dedicated-band base station shown in FIGS. 2-4, respectively.

Referring to FIG. 8, with further reference to FIGS. 1-7, an operational flow 130 has the location server 32, the mobile device 12, and base stations, here the base station 20, exchanging several messages and performing several operations. The operational flow 130 begins similarly to the operational flow 110, with the operations 90-95 of the operational flow 110 being performed in the operational flow 130. Similar to the operational flow 120, however, instead of the location server 32 sending the enable supplemental downlink 96 signal to the mobile device 12, the location server 32 sends the enable supplemental downlink 122 signal to the base station 20. Instead of proceeding from there with operations 98-100, however, in the operational flow 130, the base station 20 responds to receiving the enable supplemental downlink 122 signal by sending a reconfiguration message 132 to the mobile device 12. In this example, the reconfiguration message is an RRC (Radio Resource Control) connection reconfiguration message specifying an LTE-U node of the base stations 14-16 for the mobile device 12 to add as the SCELL. The mobile device 12 responds to receiving the reconfiguration message 132 by acknowledging 133 receipt of the reconfiguration message by sending an RRC connection reconfiguration complete message. In response to receiving the acknowledgment from the mobile device 12, the base station 20, and in particular a media access control (MAC) control element (CE) of the base station 20 cooperates with a MAC CE of the mobile device 12 to enable the supplemental downlink 134, e.g., to enable the LTE-U SDL. The use of the SCELL may then be used in positioning techniques by the location server 32 to determine the location of the mobile device 12, e.g., using knowledge of the mobile device 12 being within range of the SCELL and/or using a range to the SCELL. FIG. 8 also includes blocks 99 and 100 discussed in detail above, that may be performed using a neighbor list provided in the reconfiguration message 132 and/or the enable supplemental downlink exchange 134.

The call flow diagrams of FIGS. 6-8 are only examples. Any of the messages, signals, and/or commands discussed may be one of multiple communications used to send particular information, e.g., if the information is too large to fit into a single message. Additionally, the assistance data included in the tailored assistance data 91 may include assistance data for more than one positioning technique. Alternatively or additionally, assistance data may be provided by more than one source. For example, in addition to the location server providing assistance data, a third party may send assistance data that are not associated with the network 30 or even associated with another network. Further, other changes to FIGS. 6-8 are possible. For example, in the operational flow 130, instead of the location server 32 sending the enable supplemental downlink 122 signal and the base station 20 sending the reconfiguration message 132, the location server 32 could send the reconfiguration message to the mobile device 12 to initiate enablement of the LTE-U SDL.

Figure 9:
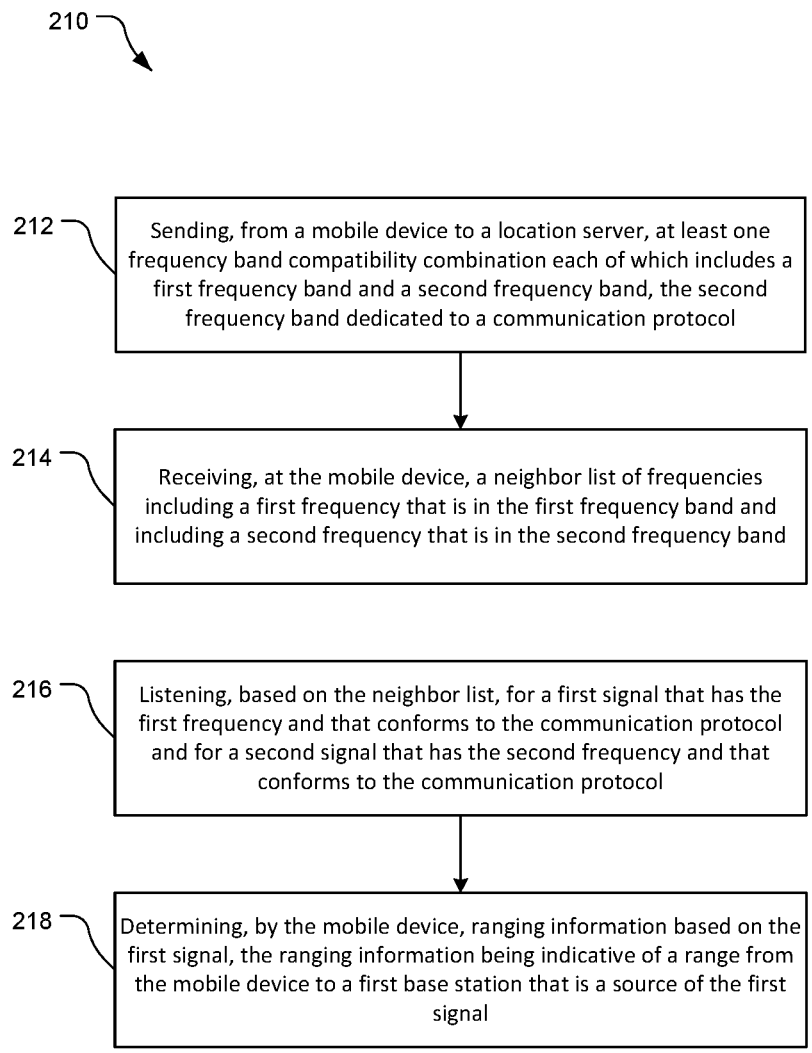
FIG. 9 is a block flow diagram of an example method of operating the wireless communication system of FIG. 1.

Referring to FIG. 9, with further reference to FIGS. 1-8, a method 210 includes the stages shown. The method 210 is, however, an example only and not limiting. The method 210 may be altered, e.g., by having stages added, removed, rearranged, combined, performed concurrently, and/or having single stages split into multiple stages.

At stage 212, the method 210 includes sending, from a mobile device to a location server, an indication of at least one frequency band compatibility combination, wherein each of the at least one frequency band compatibility combination includes a first frequency band and a second frequency band. The indication is indicative that the mobile device can concurrently process signals in the first frequency band while processing signals in the second frequency band, the second frequency band being in a dedicated frequency band that is dedicated to a communication protocol, and the first frequency band being in a separate frequency band outside the dedicated frequency band. For example, the mobile device 12, and in particular the processor 40, reports one or more of the frequency band compatibility combinations 88 from the table 86 that the mobile device 12 supports, e.g., in the provide capabilities message 90 shown in FIGS. 6-8. The second frequency band may, for example, be the LTE band (i.e., the LTE licensed band) and the first frequency band may, for example, be the LTE-U band (i.e., the unlicensed LTE band). Means for performing the functions described with respect to stage 212 can include, for example, the processor 40, the memory 42 (including the software 44), the SIM 46, the transceiver, 48, the antenna 50, and the bus 52.

At stage 214, the method 210 includes receiving, at the mobile device, a neighbor list of frequencies including a first frequency that is in the first frequency band and including a second frequency that is in the second frequency band. For example, the mobile device 12 may receive the neighbor list from the base station 20 (that may have received the neighbor list from the location server 32) as shown in block 98 in FIGS. 6-7 or in blocks 132 and/or 134 shown in FIG. 8. The neighbor list may contain only frequencies that are used by nearby base stations for sending PRS signals and that are within a frequency band included in the at least one frequency band compatibility combination. Means for performing the functions described with respect to stage 214 may include, for example, the transceiver 48, the primary receiver 38, the CA receiver 39, the antenna 50, and the bus 52.

At stage 216, the method 210 includes listening, based on the neighbor list, for a first signal that has the first frequency and that conforms to the communication protocol and for a second signal that has the second frequency and that conforms to the communication protocol. For example, the mobile device 12, and in particular the processor 40, listens for signals having the frequencies indicated in the neighbor list received in the block 98 in FIGS. 6-7 or in the block 132 and/or the block 134 in FIG. 8. The listening may comprise listening for signal of all frequencies in the neighbor list, and may include listening for signals having only frequencies in the neighbor list that are also included in the at least one frequency band compatibility combination. The listening may comprise listening for a signal at every frequency in the neighbor list that is in the separate frequency band before listening for a signal at a frequency in the neighbor list that is in the dedicated frequency band. Means for performing the functions described with respect to stage 214 can include, for example, the processor 40, the transceiver 48, the primary receiver 38, the CA receiver 39, the antenna 50, and the bus 52.

At stage 218, the method 210 includes determining, by the mobile device, ranging information based on the first signal, the ranging information being indicative of a range from the mobile device to a first base station that is a source of the first signal. The ranging information may be determined by the mobile device 12 performing measurements, as indicated by the block 99 shown in FIGS. 6-8. For example, determining the ranging information may comprise measuring a received signal strength of the first signal. As another example, determining the ranging information may comprise measuring an RSTD associated with the first signal. Means for performing the functions described with respect to stage 216 can include, for example, the processor 40, the memory 42 (including the software 44), the transceiver 48, the primary receiver 38, the CA receiver 39, the antenna 50, and the bus 52.

Various modifications to the method 210, as discussed above, are possible. For example, the method 210 may further comprise scanning, by the mobile device, the separate frequency band in response to a location request being received by the mobile device or initiated by the mobile device and reporting, from the mobile device to the location server, an identity of a base station from which a signal is received from the scanning. Scanning the separate frequency band may comprise scanning only frequencies of the at least one frequency band compatibility combination. The at least one combination may include multiple combinations each with one or more corresponding frequency bands in the separate frequency band and one or more frequency bands in the dedicated frequency band, and the method may further include receiving assistance data from the location server at the mobile device. The assistance data may correspond to multiple base stations that are configured to communicate using the communication protocol using at least one of frequency in the separate frequency band, and may indicate for the mobile device to listen for signals from base stations that use frequencies in the separate frequency band before listening for signals from other base stations. For example, the location server 32 may provide assistance data for LTE nodes and LTE-U nodes and indicate to the mobile device 12 to search for signals from the LTE-U nodes before searching for signals from the LTE nodes.

Other modifications to the method 210, as discussed above, are also possible. For example, the ranging information may be first ranging information and the method 210 may be modified to include determining second ranging information based on the second signal and reporting, from the mobile device to the location server, the first ranging information and the second ranging information, wherein the reporting prioritizes the first ranging information over the second ranging information. For example, the mobile device 12 may report LTE nodes and LTE-U nodes, to the location server 32, from which the mobile device 12 has received signals, and prioritize, e.g., rank higher, the LTE-U nodes. This may cause the location server 32 to enable LTE SDL which may improve position determination accuracy for the mobile device 12. Further, the method 210 may be modified to include emulating a high data need, which may comprise initiating a background data download. Means for emulating the high data need may comprise, for example, the processor 40, the memory (including the software 44), the SIM 46, the transceiver 48, the antenna 50, and the bus 52.

The position of the mobile device 12 may be determined using the ranging information. For example, the location server 32 may determine the position of the mobile device by trilateration using the ranging information to base stations and known locations of those base stations. Also or alternatively, the location server 32 may determine the position of the mobile device using information from another node (e.g., an LTE node or an LTE-U). For example, a signal from another node may be acquired and used for determining the position, e.g., if the first signal is not acquired during the scanning.

Other Considerations

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

A signal, or signals, may be referred to by the same term despite having been processed or otherwise altered. For example, a wireless signal may be received and transduced, and perhaps decoded or had information added or removed or have otherwise been modified, yet the wireless signal and the modified signal may both be referred to by the same term such as "the received signal." Thus, the same signal term may be used as a shorthand reference to shared content of the unmodified and the modified signal.

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process or a method that is depicted as a flow diagram or block diagram. Although operations may be discussed as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Further, more than one invention may be disclosed.

What is claimed is:

1. A mobile wireless communication device comprising:
   an antenna configured to send and receive signals in a dedicated frequency band that is dedicated to a communication protocol, and to receive signals in a separate frequency band that is separate from the dedicated frequency band; and
   a processor, communicatively coupled to the antenna, configured to:
   send, via the antenna to a location server, at least one frequency band compatibility indication wherein each of the at least one frequency band compatibility indication includes a first frequency band and a second frequency band indicative that the mobile wireless communication device can concurrently process signals in the first frequency band while processing signals in the second frequency band, the first frequency band being in the separate frequency band and the second frequency band being in the dedicated frequency band;
   receive, via the antenna, a neighbor list indicating a first frequency that is in the first frequency band and indicating a second frequency that is in the second frequency band;
   listen, based on the neighbor list, for a first signal that has the first frequency and that conforms to the communication protocol and for a second signal that has the second frequency and that conforms to the communication protocol; and
   determine ranging information based on the first signal, the ranging information being indicative of a range from the mobile wireless communication device to a first base station that is a source of the first signal.

2. The mobile wireless communication device of claim 1, wherein the processor is configured to listen for a signal at every frequency in the neighbor list that is in the separate frequency band before listening for a signal at a frequency in the neighbor list that is in the dedicated frequency band.

3. The mobile wireless communication device of claim 1, wherein the processor is configured to scan the separate frequency band in response to a location request being received by the mobile wireless communication device or initiated by the mobile wireless communication device, and wherein the processor is further configured to report, via the antenna to the location server, an identity of a base station from which a signal is received from scanning the separate frequency band.

4. The mobile wireless communication device of claim 3, wherein the processor is configured to scan, of the separate frequency band, only frequencies indicated by the at least one frequency band compatibility indication for a signal from a respective base station.

5. The mobile wireless communication device of claim 1, wherein the ranging information is first ranging information and the processor is further configured to determine second ranging information based on the second signal and to report, via the antenna to the location server in a single outbound signal, the first ranging information and the second ranging information such that the first ranging information is prioritized over the second ranging information.

6. The mobile wireless communication device of claim 1, wherein the processor is further configured to emulate a high data need when no high data need exists.

7. The mobile wireless communication device of claim 6, wherein the processor is configured to emulate the high data need by initiating a background data download.

8. The mobile wireless communication device of claim 1, wherein to determine the ranging information the processor is configured to determine a received signal strength of the first signal.

9. The mobile wireless communication device of claim 1, wherein the processor is configured to respond to a location request being received by the mobile wireless communication device or initiated by the mobile wireless communication device by changing from using a former primary cell base station, that does not operate using a frequency in the second frequency band of the at least one frequency band compatibility indication, to using a present primary cell base station that operates using a frequency in the second frequency band of the at least one frequency band compatibility indication.

10. A mobile device ranging method comprising:
    sending, from the mobile device to a location server, at least one frequency band compatibility indication wherein each of the at least one frequency band compatibility indication includes a first frequency band and a second frequency band indicative that the mobile device can concurrently process signals in the first frequency band while processing signals in the second frequency band, the second frequency band being in a dedicated frequency band that is dedicated to a communication protocol, and the first frequency band being in a separate frequency band that is outside the dedicated frequency band;
    receiving, at the mobile device, a neighbor list indicating a first frequency that is in the first frequency band and indicating a second frequency that is in the second frequency band;
    listening, based on the neighbor list, for a first signal that has the first frequency and that conforms to the communication protocol and for a second signal that has the second frequency and that conforms to the communication protocol; and
    determining, by the mobile device, ranging information based on the first signal, the ranging information being indicative of a range from the mobile device to a source base station that is a source of the first signal.

11. The method of claim 10, wherein the listening comprises listening for a signal at every frequency in the neighbor list that is in the separate frequency band before listening for a signal at a frequency in the neighbor list that is in the dedicated frequency band.

12. The method of claim 10, further comprising:
    scanning, by the mobile device, the separate frequency band in response to a location request being received by the mobile device or initiated by the mobile device; and
    reporting, from the mobile device to the location server, an identity of a base station from which a signal is received from the scanning.

13. The method of claim 12, wherein the scanning the separate frequency band comprises scanning only frequencies of the at least one frequency band compatibility indication.

14. The method of claim 10, wherein the ranging information is first ranging information, the method further comprising determining second ranging information based on the second signal and reporting, from the mobile device to the location server in a single outbound signal, the first ranging information and the second ranging information, wherein the reporting prioritizes the first ranging information over the second ranging information.

15. The method of claim 10, further comprising emulating, by the mobile device, a high data need when no high data need exists.

16. The method of claim 15, wherein the emulating comprises initiating a background data download.

17. The method of claim 10, wherein determining the ranging information comprises measuring a received signal strength of the first signal.

18. A non-transitory, processor-readable storage medium comprising processor-readable instructions configured to instruct one or more processors to:
send, to a location server, at least one frequency band compatibility indication supported by a mobile device, each of the at least one frequency band compatibility indication including a first frequency band and a second frequency band indicative that the mobile device can concurrently process signals in the first frequency band while processing signals in the second frequency band, the second frequency band being in a dedicated frequency band that is dedicated to a communication protocol, and the first frequency band being in a separate frequency band that is outside the dedicated frequency band;
receive a neighbor list indicating a first frequency that is in the first frequency band and indicating a second frequency that is in the second frequency band;
listen, based on the neighbor list, for a first signal that has the first frequency and that conforms to the communication protocol and for a second signal that has the second frequency and that conforms to the communication protocol; and
determine ranging information based on the first signal, the ranging information being indicative of a range from the mobile device to a source base station that is a source of the first signal.

19. The storage medium of claim 18, wherein the instructions configured to instruct the one or more processors to listen are configured to instruct the one or more processors to listen for a signal at every frequency in the neighbor list that is in the separate frequency band before listening for a signal at a frequency in the neighbor list that is in the dedicated frequency band.

20. The storage medium of claim 18, further comprising instructions configured to instruct the one or more processors to scan the separate frequency band in response to a location request being received or initiated by the mobile device.

21. The storage medium of claim 20, wherein the instructions configured to instruct the one or more processors to scan are configured to instruct the one or more processors to scan only frequencies of the at least one frequency band compatibility indication.

22. The storage medium of claim 18, wherein the ranging information is first ranging information, the storage medium further comprising instructions configured to instruct the one or more processors to determine second ranging information based on the second signal and to report, to the location server in a single outbound signal, the first ranging information and the second ranging information with the first ranging information prioritized over the second ranging information.

23. The storage medium of claim 22, further comprising instructions configured to instruct the one or more processors to emulate a high data need when no high data need exists.

24. A mobile wireless communication device comprising:
means for sending, to a location server, at least one frequency band compatibility indication supported by the mobile wireless communication device, each of the at least one frequency band compatibility indication including a first frequency band and a second frequency band indicative that the mobile wireless communication device can concurrently process signals in the first frequency band while processing signals in the second frequency band, the second frequency band being in a dedicated frequency band that is dedicated to a communication protocol, and the first frequency band being in a separate frequency band that is outside the dedicated frequency band;
means for receiving a neighbor list indicating a first frequency that is in the first frequency band and indicating a second frequency that is in the second frequency band;
means for listening, based on the neighbor list, for a first signal that has the first frequency and that conforms to the communication protocol and for a second signal that has the second frequency and that conforms to the communication protocol; and
means for determining ranging information based on the signal from the first base station, the ranging information being indicative of a range from the mobile wireless communication device to the first base station.

25. The mobile wireless communication device of claim 24, wherein the means for listening are for listening for a signal at every frequency in the neighbor list that is in the separate frequency band before listening for a signal at a frequency in the neighbor list that is in the dedicated frequency band.

26. The mobile wireless communication device of claim 24, further comprising means for scanning the separate frequency band in response to a location request being received by the mobile wireless communication device or initiated by the mobile wireless communication device.

27. The mobile wireless communication device of claim 26, wherein the means for scanning are for scanning, of the separate frequency band, only frequencies of the at least one frequency band compatibility indication.

28. The mobile wireless communication device of claim 24, wherein the ranging information is first ranging information and the means for determining are further for determining second ranging information based on the second signal, the mobile wireless communication device further comprising means for reporting, to the location server in a single outbound signal, the first ranging information and the second ranging information with the first ranging information prioritized over the second ranging information.

29. The mobile wireless communication device of claim 28, further comprising means for emulating a high data need when no high data need exists.

30. The mobile wireless communication device of claim 29, wherein the means for emulating the high data need are for initiating a background data download.

\* \* \* \* \*